(12) United States Patent
Parsons (10) Patent No.: US 7,913,972 B2
(45) Date of Patent: Mar. 29, 2011

(54) TWO POSITION ACTUATOR WITH MECHANICAL HOLD

(75) Inventor: Gerald R. Parsons, Caledonia, IL (US)

(73) Assignee: Schneider Electric Buildings, LLC, Loves Park, IL (US)

(*) Notice: Subject to any disclaimer, the term of this patent is extended or adjusted under 35 U.S.C. 154(b) by 554 days.

(21) Appl. No.: 12/025,460

(22) Filed: Feb. 4, 2008

(65) Prior Publication Data

US 2009/0194723 A1    Aug. 6, 2009

(51) Int. Cl.
 *F16K 35/00* (2006.01)
(52) U.S. Cl. ......... 251/116; 251/111; 251/115; 251/292
(58) Field of Classification Search .............. 251/111, 251/113, 114, 115, 116, 129.11, 291, 292
See application file for complete search history.

(56) References Cited

U.S. PATENT DOCUMENTS

| | | | |
|---|---|---|---|
| 3,319,646 A | 5/1967 | Smulka | |
| 4,549,446 A | 10/1985 | Beeson | |
| 4,705,063 A | 11/1987 | Robinson | |
| 5,205,534 A | 4/1993 | Giordani | |
| 5,727,653 A | 3/1998 | Grossenbacher et al. | |
| 6,073,907 A * | 6/2000 | Schreiner et al. | 251/129.12 |
| 6,974,119 B2 | 12/2005 | Brendle et al. | |
| 6,979,965 B2 | 12/2005 | McMillan et al. | |
| 7,048,251 B2 | 5/2006 | Schreiner | |
| 7,055,795 B2 | 6/2006 | Lay | |
| 2002/0108747 A1 | 8/2002 | Dietz et al. | |
| 2004/0129253 A1 | 7/2004 | Ozeki et al. | |
| 2004/0226538 A1 | 11/2004 | Cannone et al. | |
| 2005/0263731 A1 | 12/2005 | Fauni | |

FOREIGN PATENT DOCUMENTS

| | | |
|---|---|---|
| EP | 1 347 249 A1 | 9/2003 |
| JP | 2001207873 A | 8/2001 |
| JP | 2005140034 A | 6/2005 |
| WO | WO 99/24745 A1 | 5/1999 |

* cited by examiner

*Primary Examiner* — John K Fristoe, Jr.
(74) *Attorney, Agent, or Firm* — Reinhart Boerner Van Deuren P.C.

(57) ABSTRACT

A valve assembly including a valve actuator and valve is provided. The valve actuator includes a mechanical hold arrangement configured to allow manually setting the position of the valve actuator and its drive gear and to oppose any loading provided by a return spring biasing the valve actuator and drive gear out of the set position. The valve actuator includes a spring lever and a recess in which the spring lever is secured to lock the position of the valve actuator and drive gear when the electric motor of the valve actuator is de-energized. The valve actuator can be reconfigured to provide mechanical holding for manually setting the orientation of the drive gear when a return spring load is provided in either a clockwise or counter-clockwise direction.

16 Claims, 7 Drawing Sheets

TWO POSITION ACTUATOR WITH MECHANICAL HOLD

FIELD OF THE INVENTION

This invention generally relates to valve actuators and more particularly motor driven valve actuators having return springs for driving the valve actuator to a predetermined position upon loss of power to the drive motor.

BACKGROUND OF THE INVENTION

Numerous valve actuators, and particularly valve actuators for heating/cooling valves, incorporate an electric motor as the primary power source to operably drive the valve between open and closed conditions. A gear train amplifies and transfers the torque from the motor to the valve. More particularly, the valve actuator rotates a valve member or manipulates a fluid control device, typically a ball, between the open and closed conditions.

Some valve actuators incorporate a return spring coupled to the gear train to drive the gear train in the opposite direction and return the valve member to a predetermined position when power is removed from the motor. The return spring is stretched as the gear train is driven by the electric motor and stores potential energy until the electric motor is de-energized. When the motor is de-energized the return spring contracts and back drives the gear train returning the valve member to the desired predetermined position, e.g. an open position or a closed position.

For example, a normally closed configuration will be configured such that if power is lost, the return spring will back drive the gear train to a predetermined position in which the actuator closes the valve, through the use of the mechanical energy stored in the spring. Conversely, a normally open configuration will be configured such that if power is lost, the return spring will back drive the gear train to a predetermined position in which the actuator opens the valve, through the use of the mechanical energy stored in the spring.

Depending on the configuration of the valve, a valve actuator that operates in a clockwise direction or a valve actuator that operates in a counter-clockwise direction may be required.

In some valve actuators, it is desired to be able to manually set the position of the valve member via the valve actuator using a manual positioning lever of the valve actuator coupled to the gear train. As the user manually sets the position of the valve member, the return spring is stretched to store potential energy for ultimately back driving the system to the predetermined position. However, without any resistance acting against the return spring by the electric motor, the valve actuator cannot remain in the manually set position.

This invention pertains to improvements in valve actuators that permit manually setting the position or orientation of the valve member coupled to the valve actuator.

BRIEF SUMMARY OF THE INVENTION

The present invention has several aspects that may be claimed and stand as patentable independently and individually or in combination with other aspects, including but not limited to the following.

Embodiments of the present invention provide improved latch arrangements that permit manually setting the valve actuator and maintaining the set position.

In one aspect, the invention provides a valve actuator including a support structure, a drive gear, a return spring and a latch arrangement. The drive gear is supported by the support structure for rotation about an axis of rotation. The return spring is interposed between the drive gear and the support structure. The return spring biases the drive gear in a first direction about the axis of rotation. The latch arrangement permits manually setting the orientation of the drive gear relative to the support structure. The latch arrangement includes a spring lever operably coupled to the drive gear for coordinated rotation of the drive gear and spring lever. The spring lever extends out of the support structure through a slot of the support structure. The slot of the support structure includes a first recessed portion including a first abutment wall. The latch arrangement has a locked condition in which the spring lever is positioned within the first recess and is biased against the first abutment wall by biasing provided by the return spring in the first direction. The latch arrangement has an unlocked condition in which the spring lever is positioned above the first recess and the first abutment wall such that the first abutment wall will not interfere with movement of the spring lever during movement of the spring lever in the first direction.

In another aspect, an embodiment of the present invention provides a valve assembly including a valve actuator and a valve. The valve actuator includes a latch arrangement that permits manually setting the orientation of the valve actuator. To provide this feature, an embodiment of the valve actuator includes a support structure, a drive gear, a return spring and a latch arrangement. The drive gear is supported by the support structure for rotation about an axis of rotation. The return spring is interposed between the drive gear and the support structure. The return spring biases the drive gear in a first direction about the axis of rotation. The latch arrangement permits manually setting the orientation of the drive gear relative to the support structure. The latch arrangement includes a spring lever operably coupled to the drive gear for coordinated rotation of the drive gear and spring lever. The spring lever extends out of the support structure through a slot of the support structure. The slot of the support structure includes a first recessed portion including a first abutment wall. The latch arrangement has a locked condition in which the spring lever is positioned within the first recess and is biased against the first abutment wall by biasing provided by the return spring in the first direction. The latch arrangement has an unlocked condition in which the spring lever is positioned above the first recess and the first abutment wall such that the first abutment wall will not interfere with movement of the spring lever during movement of the spring lever in the first direction. In a particular embodiment, the mechanical latch arrangement remains with the valve actuator when the valve actuator is removed from the valve.

In more particular implementations of preferred valve actuators, the valve actuator, and more particularly the latch arrangement, can be reconfigured such that the valve actuator can be configured for either clockwise or counter-clockwise operation.

Other embodiments of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
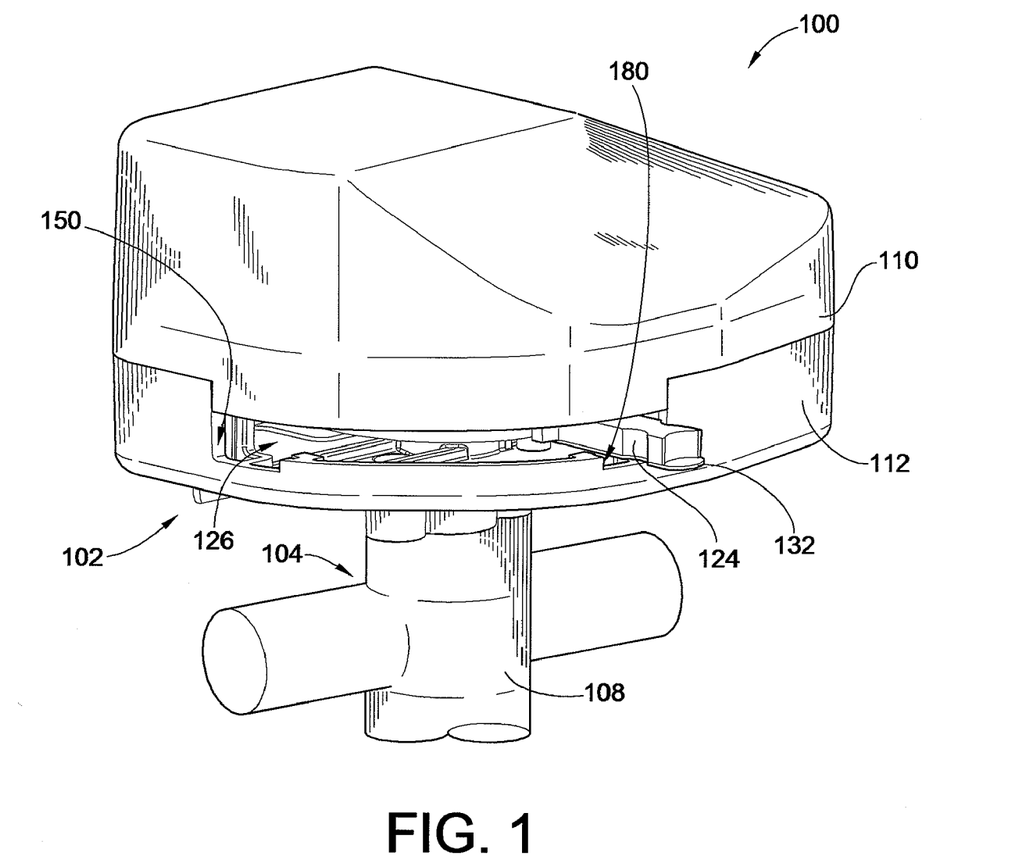
FIG. 1 is an exemplary embodiment of a valve assembly including a valve actuator in accordance with the teachings of the present invention coupled to a valve.

FIG. 1 illustrates a valve assembly 100 including a valve actuator 102 connected to a valve 104. The valve 104 includes an internal valve member (not shown) that moves within valve body 108 between an open position and a closed position, as is well known in the art, to control the flow of fluid therethrough. The valve actuator 102 controls the orientation of the valve member within the valve body 108. Typically, the valve member is in the form of a ball or other fluid controlling device that rotates within the valve body 108.

The valve actuator 102 includes a support structure that supports and houses the internal components of the valve actuator 102. As illustrated, the support structure includes top and bottom housing parts 110, 112.

Figure 2:
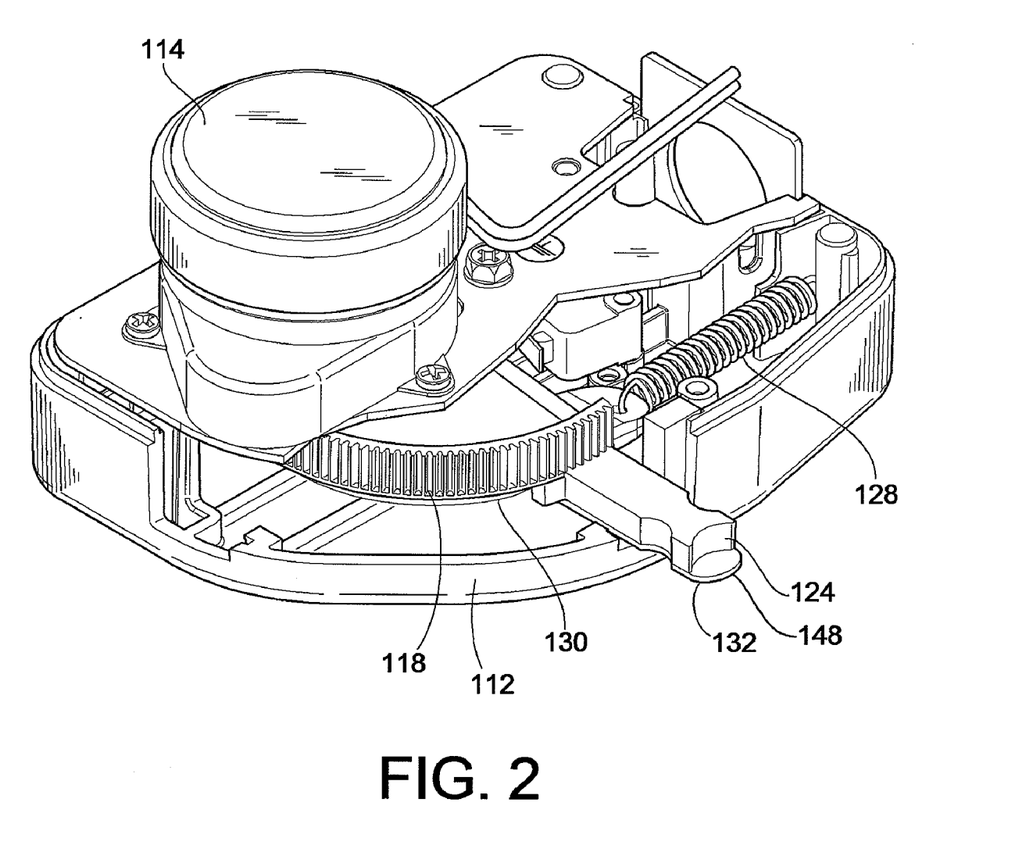
FIG. 2 is a partial isometric illustration of the valve actuator of FIG. with a portion of the housing removed illustrating the internal components of the valve actuator.

With reference to FIG. 2, the valve actuator 102 includes an electric motor 114 that is operably coupled to a drive gear 118, which forms part of a gear train of the valve actuator 102. Both, the motor 114 and drive gear 118, are supported by the support structure, and particularly bottom housing part 112. The electric motor 114 includes a pinion gear (not shown) that engages drive gear 118 such that the electric motor 114 can drive the drive gear 118 about an axis of rotation 120 (see FIG. 3). In operation, the drive gear 118 is operably coupled to the valve member of the valve 104 such that the output of the electric motor 114 is ultimately transferred to the valve member.

The drive gear 118 includes a manual positioning lever 124 that extends out of the support structure through slot 126 (see FIG. 1). The manual positioning lever 124 provides a user operable lever that permits manually controlling the valve actuator 102 and manually setting the position of the valve member via the valve actuator 102. The position of the manual positioning lever 124 relative to the top and bottom housing parts 110, 122 also provides a visual indication of the orientation of the valve member, i.e. whether the valve member is in an open or closed position.

A return spring 128 is operably coupled between the bottom housing part 112 and the drive gear 118 through drive coupling 130. The return spring 128 operates to drive the drive gear 118 about axis 120 toward a predetermined default position when power from the electric motor 114 is lost or otherwise not supplied to the electric motor 114. In FIG. 2, the valve actuator 102 is oriented in the predetermined position, with the manual positioning lever biased against a positive stop by loading provided by return spring 128.

The valve actuator 102 further includes a latch arrangement that permits locking the position of the drive gear 118 to oppose the load provided by the return spring 128 in the event that it is desired to power-down the electric motor 114. The latch arrangement of the present embodiment includes spring lever 132. The spring lever 132 engages one of the sidewalls forming or proximate one of the recesses formed in slot 126 of the bottom housing part 112. The spring lever 132 permits manually setting the valve actuator 102 in a position other than the predetermined default position, by preventing the return spring 128 from rotating the drive gear 118 back to the predetermined position, as will be more fully explained below.

Figure 3:
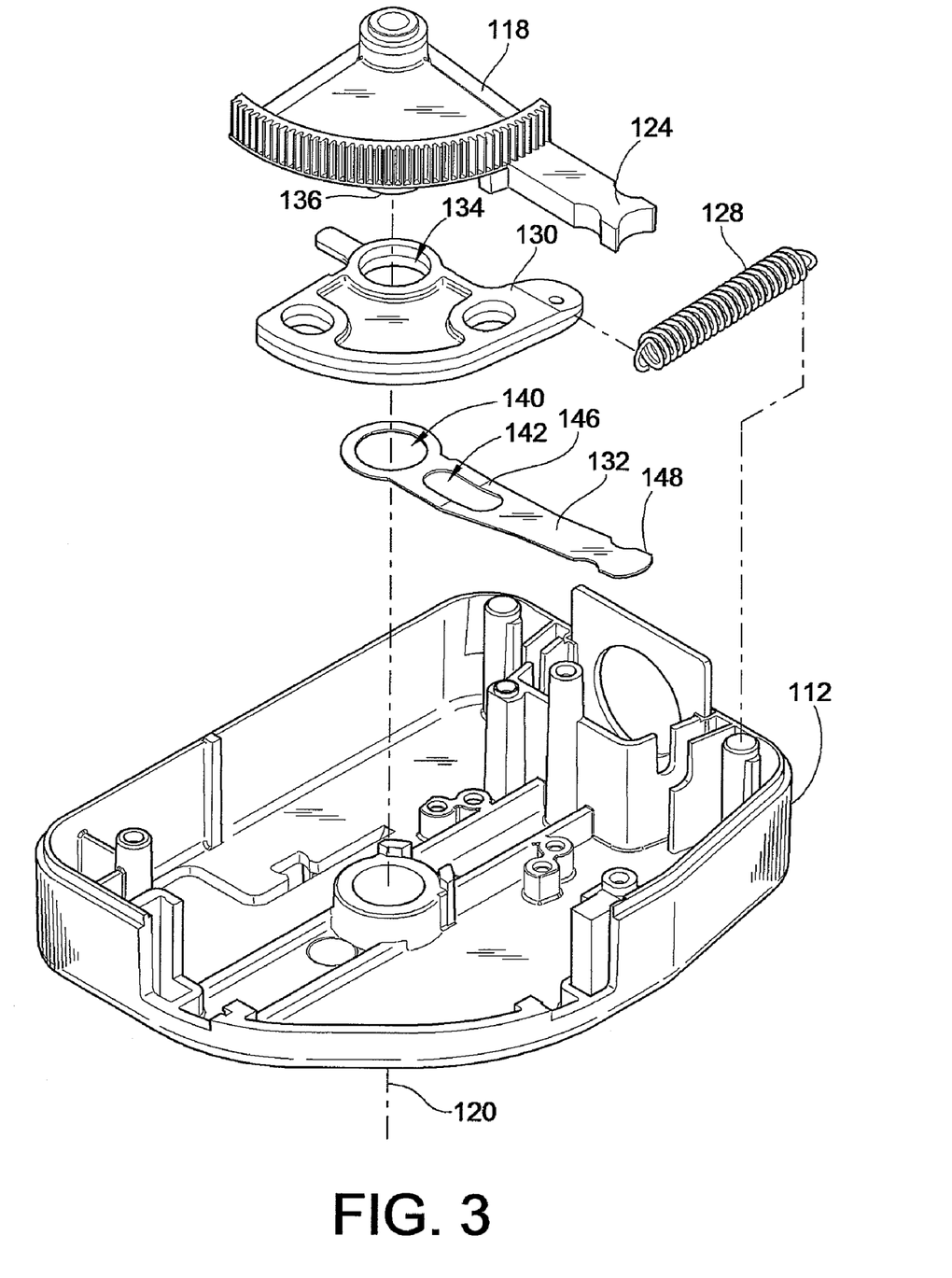
FIG. 3 is a partial exploded illustration of the valve actuator of FIG. 1.

FIG. 3 illustrates a partial exploded illustration of the drive gear 118, drive coupling 130, spring lever 132 and return spring 128. When assembled, drive gear 118, drive coupling 130, and spring lever 132 all of which rotate about axis 120.

The drive coupling 130 mounts to the drive gear 118 such that it operably transfers load of the return spring 128 to the drive gear 118. The drive coupling includes a mounting aperture 134 having an inner diameter closely sized to the outside diameter of a coupling shaft 136 of the drive gear 118 such that the two components are permitted to co-axially rotate about axis 120. The coupling shaft forms a socket 137 configured to engage and transfer rotational motion to an cooperating end of a valve stem (not shown) of the valve for controlling the orientation of a valve member.

As illustrated in FIG. 3, the spring lever 132 includes a mounting aperture 140 for mounting the spring lever 132 to the coupling shaft 136 of the drive gear 118 for coaxial rotation about axis 120. The spring lever 132 further includes a torque transfer slot 142 that receives peg 145 of the drive gear 118 (See FIG. 4) to transfer torque between the two components. The interaction of peg 145 and slot 142 prevents substantial relative angular movement between the spring lever 132 and drive gear 118. Thus, when electric motor 114 automatically rotates or an operator manually manipulating manual positioning lever 124 rotates the drive gear 118 about axis 120, the spring lever 132 also rotates about axis 120. Similarly, if spring lever 132 is prevented from rotating about axis 120, the drive gear 118 is also prevented from rotating about axis 120.

Figure 4:
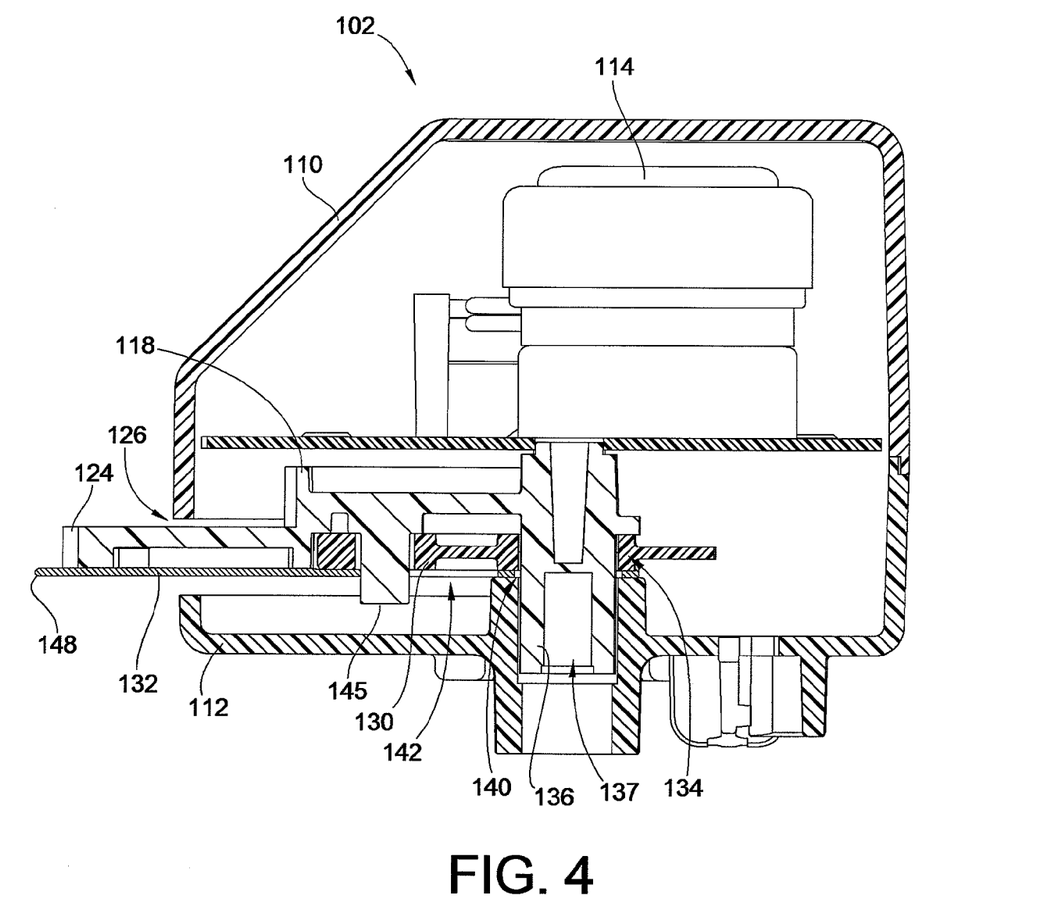
FIG. 4 is a cross-sectional illustration of the valve actuator of FIG. 1.

Spring lever 132 is bent at bend 146, such that when the spring lever 132 is substantially flattened, the free end 148 of the spring lever 132 is biased toward the manual positioning lever 124 (see FIG. 4).

As is illustrated in FIG. 4, the spring lever 132 is positioned between the drive gear 118 and the bottom housing part 112. When the valve actuator 102 is assembled, the spring lever 132 extends radially through slot 126. The free end 148 of spring lever 132 extends radially beyond the free end of the manual positioning lever 124. As such, an operator can manipulate spring lever 132 by pressing free end 148 free of interference by manual positioning lever 124.

With reference to FIGS. 5-8, the process of manually setting the spring lever 132 will be described.

Figure 5:
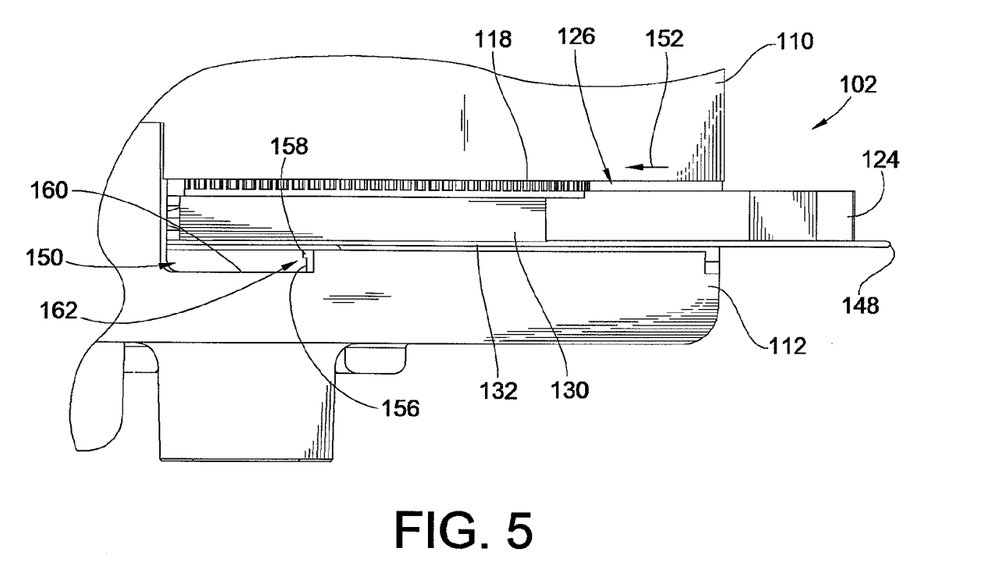
FIGS. 5-8 illustrate the various positions of the spring lever and drive gear as the spring lever transitions between locked and un-locked states.

FIG. 5 illustrates the spring lever 132 in an unlocked condition. In this state, the manual positioning lever 124 of the drive gear 118 and spring lever 132 extend through slot 126 and are angularly aligned with a narrower portion of slot 126 that interconnects recesses 150 and 180 at opposite ends of slot 126. Spring lever 132 is biased toward manual positioning lever 124 to the bent configuration of the spring lever 132 prior to assembly, as shown in FIG. 3. In this configuration, the drive gear 118 and spring lever 132 are free to rotate about axis 120 to orient the drive gear 118 and manual positioning lever 124 along slot 126 to a desired position, and ultimately to orient an operably coupled valve member.

Figure 6:
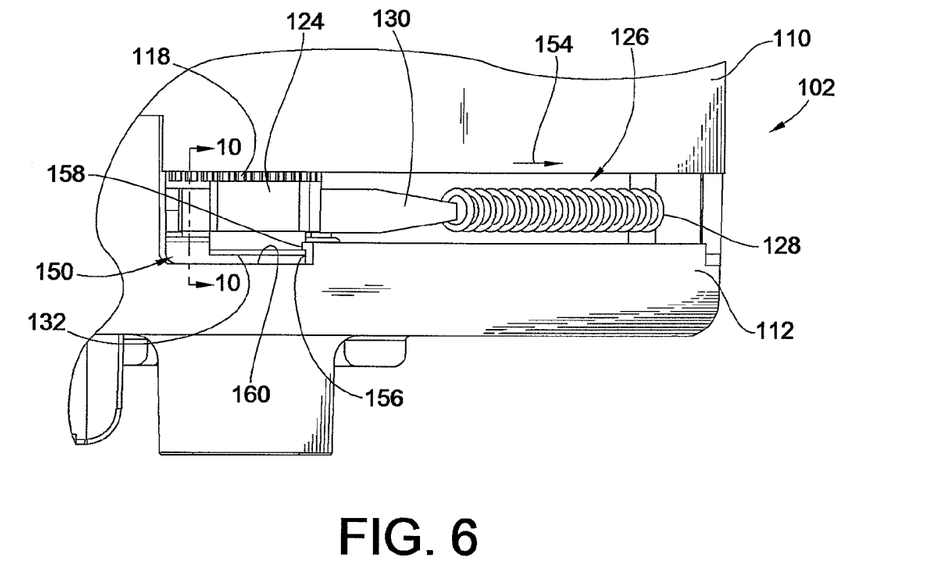

FIG. 6 illustrates the spring lever 132 in a desired locked condition (i.e. a set position). To transition the valve actuator 102 to the set position, the manual positioning lever 124 is biased towards (illustrated by arrow 152 in FIG. 5) locking recess 150. As the drive gear 118 rotates to the set position, the return spring 128 stretches.

In the set position, the spring lever 132 prevents the drive gear 118 from returning toward the position illustrated by FIG. 5 under the load (illustrated by arrow 154) applied by return spring 128.

Figure 10:
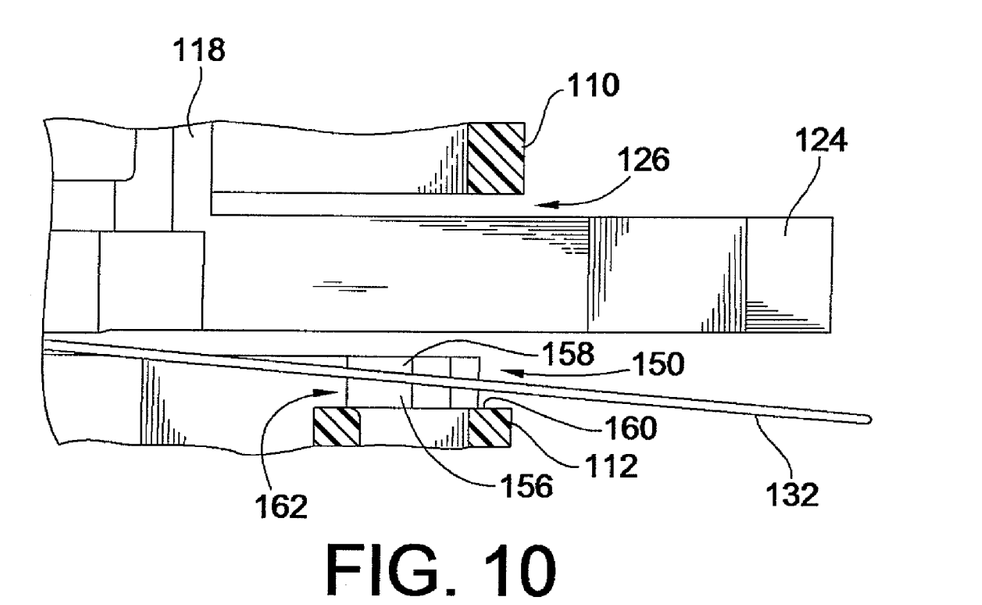
FIG. 10 is a partial cross-sectional illustrations of the valve actuator of FIG. 6 about line 10-10 illustrating the spring lever in a locked position.

To secure the spring lever 132, and consequently the valve actuator 102 in the set position, the spring lever 132 is resiliently bent away from the manual positioning lever 124 and into recess 150. The spring lever 132 is biased angularly against abutment wall 156 forming part of recess 150 due to loading 154 of return spring 128. With additional reference to FIG. 10, in the illustrated embodiment, the bottom housing part 112 includes a catch 158 extending angularly over the spring lever 132 preventing the spring lever 132 from bending out of recess 150. More particularly, the catch 158 and bottom wall 160 of recess 150 form a gap 162 therebetween. The spring lever 132 inserts into the gap 162 in the locked position.

The spring lever 132 passes through two positions as it transition the spring lever 132 from the free state (see e.g. FIG. 5) in which the drive gear 118 can rotate about axis 120 to the locked state (see FIG. 6) in which the drive gear 118 is prevented from rotating about axis 120 under loading by the return spring 128 due to interference by recess 150, and more particularly wall 156.

Figure 7:
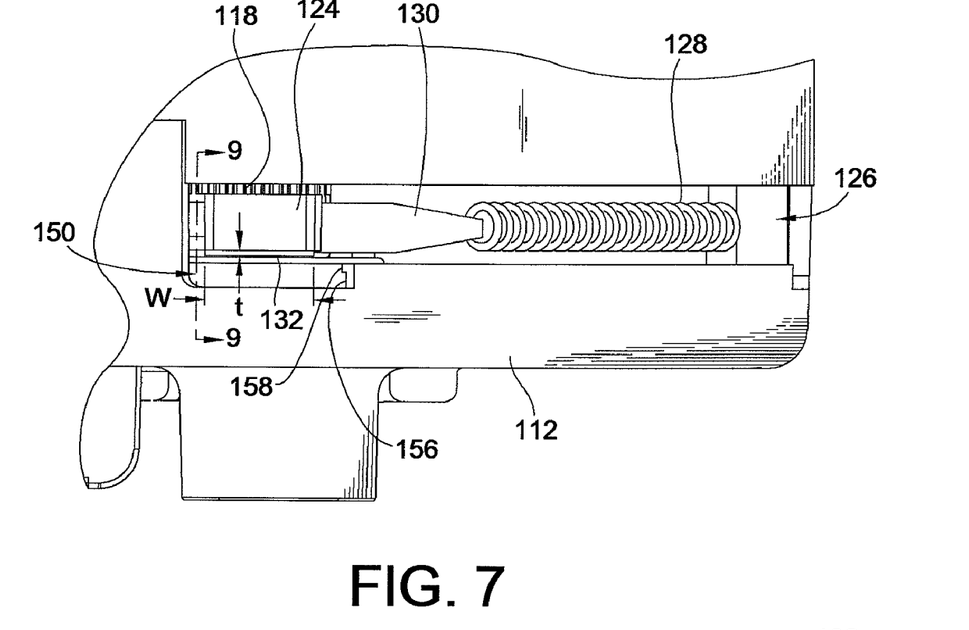
Figure 8:
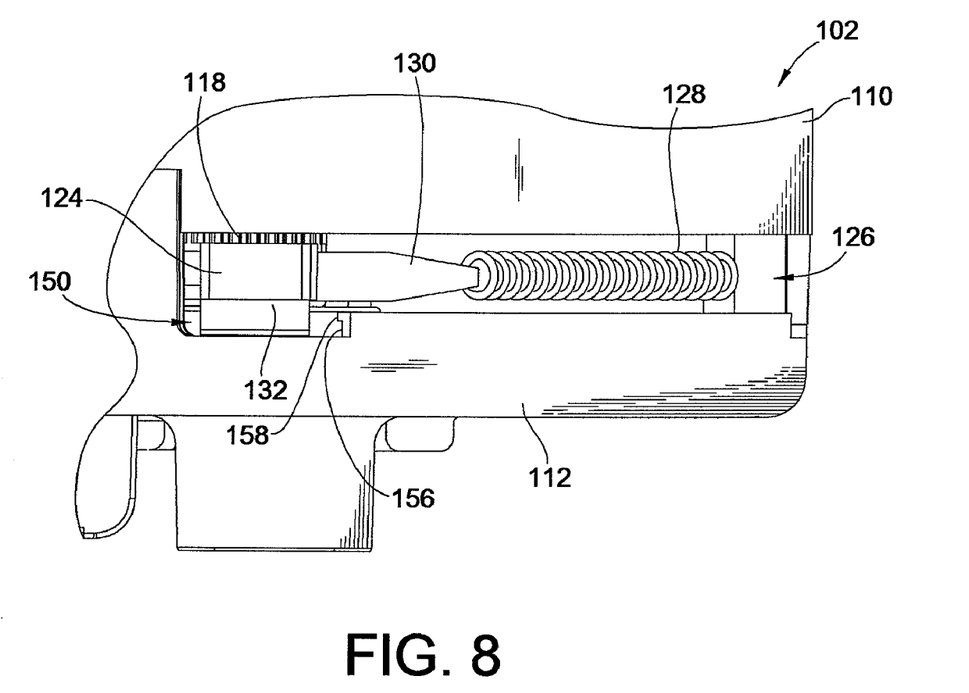
Figure 9:
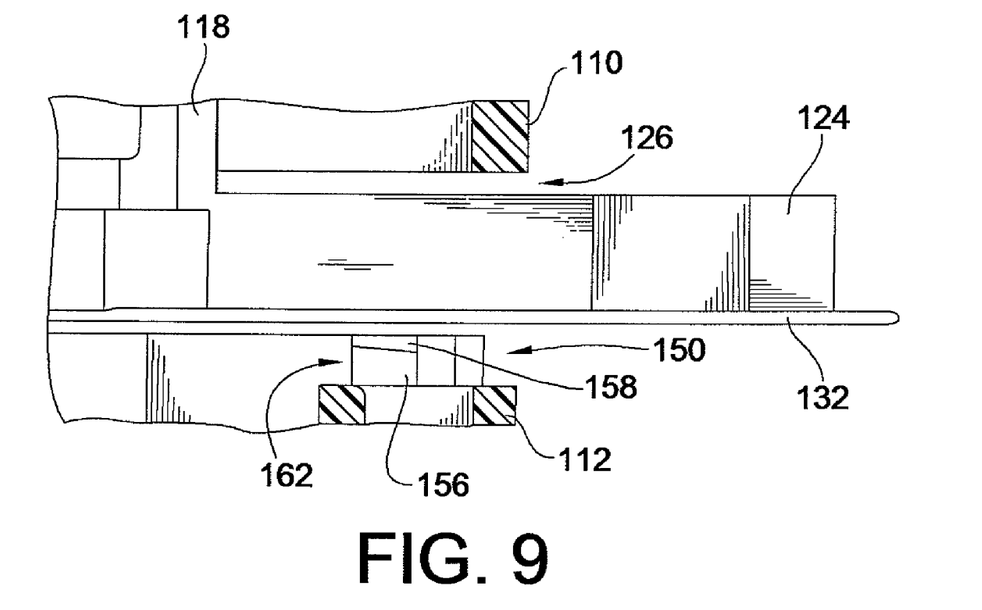
FIG. 9 is a partial cross-sectional illustrations of the valve actuator of FIG. 7 about line 9-9 illustrating the spring lever in an unlocked position.

First, the spring lever 132 and drive gear 118 are rotated to the position illustrated in FIG. 7, wherein the spring lever 132 is positioned angularly proximate recess 150 and vertically free of catch 158 and wall 156 (see also FIG. 9). Then, the spring lever 132 is biased away from the manual positioning lever 124 and into recess 150 (see FIG. 8). Once the spring lever 132 is biased into recess 150, the drive gear 118 and spring lever 132 are back driven a slight distance such that the spring lever 132 enters gap 162 and abuts wall 158. In this position, wall 156 interferes with the angular movement of spring lever 132 which in-turn prevents the angular movement of the drive gear 118, thus, locking the drive gear 118 in the established position.

To unlock the spring lever 132, the transition is reversed. More particularly, drive gear 118 and spring lever 132 are driven or manually actuated in direction 152 and the spring lever 132 resiliently flexed out of recess 150 to ward manual positioning lever 124.

One beneficial feature of the present invention is that the valve actuator 102 can be automatically unlocked using the electric motor 114 and without having to manually manipulate the spring lever 132. To automatically unlock the spring lever 132, the electric motor 114 can drive the drive gear 118 and spring lever 132 away from wall 156 and the resiliency of spring lever 132 and potential energy stored by the spring lever 132 being bent into recess 150 will cause the spring lever to bend toward manual positioning lever 124 and out of recess 150 and to the position illustrated in FIGS. 7 and 9. At that point, the spring lever 132 and consequently drive gear 118 are free to rotate angularly about axis 120, either under the manual control of an operator or electric motor 114.

The spring lever 132 is preferably formed of a flexible resilient metal. The spring lever 132 has a thickness t that is sufficiently thick relative to width W that the spring lever 132 will not bend or buckle due to the angular loading of the return spring 128 into wall 156.

In the illustrated embodiment and with reference to FIG. 1, the spring lever 132 is part of the valve actuator 102 and secured within housing parts 110 and 112. When the valve actuator 102 is separated from a valve 104, the spring lever 132 remains with the valve actuator 102 rather than remains with the valve 104.

While the illustrated embodiment utilizes a separate spring lever 132 in combination with a separate drive gear 118, and particularly a manual positioning lever 124, in alternative embodiments, the manual positioning lever 124 can be the spring lever, such that a separate component is not required.

Further, while the illustrated embodiment includes angularly extending catch 158, alternative embodiments may not incorporate a catch. Instead, the valve actuator may rely on friction formed between the spring lever 132 and the wall 156 to prevent the spring lever 132 from biasing out of recess 150. The friction between these two components is amplified due to the load 154 provided by return spring 128 biasing the spring lever 132 into wall 158.

It is another feature of the illustrated embodiment that the valve actuator 102 can be reconfigured such that the mechanical hold operates in the opposite direction as is illustrated in FIGS. 5-8. As illustrated in FIG. 1, slot 126 formed between the top and bottom housing parts 110, 112 includes a second recess 180. Recess 180 is spaced apart from recess 150 along slot 126 and located at the opposite end of slot 126. Recess 180 is substantially identical to recess 150 and operates to retain the spring lever 132 in substantially the same way as recess 150. However, recess 180 is used when the drive gear 118 and return spring 128 are configured such that the drive gear 118 is biased in the opposite direction as the configuration of FIGS. 5-8. Thus, the valve actuator can be configured to provide the mechanical hold feature provided by spring lever 132 for both clockwise and counter-clockwise rotation about axis 120, by merely switching the direction at which the return spring 128 biases the drive gear 118 and spring lever 132 assembly.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A valve actuator comprising:
   a support structure;
   a drive gear supported by the support structure for rotation about an axis of rotation;
   a return spring biasing the drive gear in a first direction about the axis of rotation;
   a latch arrangement for manually setting the orientation of the drive gear relative to the support structure, the latch arrangement including a spring level operably coupled to the drive gear for coordinated rotation of the drive gear and spring lever, the sprig lever extending out of the support structure through a slot of the support structure, the slot of the support structure including a first recessed portion including a first abutment wall, the latch arrangement having a locked condition in which the spring lever is positioned within the first recess and is biased against the first abutment wall by biasing provided by the return spring in the first direction, the latch arrangement having an unlocked condition in which the spring lever is positioned above the first recess and the first abutment wall such that the first abutment wall will not interfere with movement of the spring lever during movement of the spring lever in the first direction;
   wherein the spring lever is resiliently bent into the first recess in a second direction extending generally parallel to the axis of rotation in the locked condition; and
   wherein the first recess includes a bottom wall extending generally perpendicular to the abutment wall and the support structure includes a catch extending beyond the first abutment wall in a third direction, generally opposite the first direction, the catch and bottom wall forming a gap therebetween, the spring lever inserted into the gap and between the catch and bottom wall in the locked position, the catch securing the spring lever within the first recess until the spring lever is moved away from the first abutment wall in the third direction.

2. The valve actuator of claim 1, wherein the spring lever is a separate component independent of the drive gear.

3. The valve actuator of claim 1, further including a motor operably coupled to the drive gear, and wherein the motor drives the drive gear in the third direction away from the first abutment wall such that the spring lever automatically transition from the locked condition being within the first recess to the unlocked condition being out of the first recess without assistance from an external biasing member.

4. A valve actuator comprising:
   a support structure;
   a drive gear supported by the support structure for rotation about an axis of rotation;
   a return spring biasing the drive gear in a first direction about the axis of rotation;
   a latch arrangement for manually setting the orientation of the drive gear relative to the support structure, the latch arrangement including a spring lever operably coupled to the drive gear for coordinated rotation of the drive gear and spring lever, the spring lever extending out of the support structure through a slot of the support structure, the slot of the support structure including a first recessed portion including a first abutment wall, the latch arrangement having a locked condition in which the spring lever is positioned within the first recess and is biased against the first abutment wall by biasing provided by the return spring in the first direction, the latch arrangement having an unlocked condition in which the spring lever is positioned above the first recess and the first abutment wall such that the first abutment wall will not interfere with movement of the spring lever during movement of the spring lever in the first direction;
   wherein the spring lever is resiliently bent into the first recess in a second direction extending generally parallel to the axis rotation in the locked condition; and
   wherein the latch arrangement includes a second recess formed in the slot of the support structure, the second recess being spaced apart from the first recess in the first direction, the second recess including a second abutment wall, the return spring being reconfigurable relative to the drive gear to bias the drive gear in a third direction about the axis of rotation, opposite the first direction, in this configuration, the latch arrangement has a locked condition in which the spring lever is positioned within the second recess and is biased against the second abutment wall by biasing provided by the return spring in the third direction, the latch arrangement having an unlocked condition in which the spring lever is positioned above the second recess and the second abutment wall such that the second abutment wall will not interfere with movement of the spring lever during movement of the spring lever in the third direction.

5. The valve actuator of claim 4, wherein in the locked position, friction between the first abutment wall and spring lever is greater than a spring force biasing the spring lever out of the first recess due to the resilient bending of the spring lever.

6. The valve actuator of claim 4, wherein the spring lever is a manual positioning lever integrally formed as part of the drive gear, the manual positioning lever extends through the slot and exterior of the support structure.

7. A valve actuator comprising:
   a support structure;
   a drive gear supported by the support structure for rotation about an axis of rotation;
   a return spring biasing the drive gear in a first direction about the axis of rotation;
   a latch arrangement for manually setting the orientation of the drive gear relative to the support structure, the latch arrangement including a spring lever operably coupled to the drive gear for coordinate rotation of the drive gear and spring lever, the spring lever extending out of the support structure through a slot of the support structure, the slot of the support structure including a first recessed portion including a first abutment wall, the latch arrangement having a locked condition in which the spring lever is positioned within the first recess and is biased against the first abutment wall by biasing provided by the return spring in the first direction, the latch arrangement having an unlocked condition in which the spring lever is positioned above the first recess and the first abutment wall such that the first abutment wall will not interfere with movement of the spring lever during movement of the spring lever in the first direction;

wherein the spring lever is resiliently bent into the first recess in a second direction extending generally parallel to the axis of rotation in the locked condition;

wherein the spring lever is a separate component independent of the drive gear; and wherein the drive gear includes a manual positioning lever that extends through the slot and exterior of the support structure and is generally angularly aligned with the spring lever.

8. A valve actuator comprising:

a support structure;

a drive gear supported by the support structure for rotation about an axis of rotation;

a return spring biasing the drive gear in a first direction about the axis of rotation;

a latch arrangement for manually setting the orientation of the drive gear relative to the support structure, the latch arrangement including a spring lever operably coupled to the drive gear for coordinated rotation of the drive gear and spring lever, the spring lever extending out of the support structure through a slot of the support structure, the slot of the support structure including a first recessed portion including a first abutment wall, the latch arrangement having a locked condition in which the spring lever is positioned within the first recess and is biased against the first abutment wall by biasing provided by the return spring in the first direction, the latch arrangement having an unlocked condition in which the spring lever is positioned above the first recess and the first abutment wall such that the first abutment wall will not interfere with movement of the spring lever during movement of the spring lever in the first direction;

wherein the spring lever is resiliently bent into the first recess in a second direction extending generally parallel to the axis of rotation in the locked condition; and wherein the drive gear includes a coupling shaft extending along the axis and defining a socket therein and a peg radially spaced from the coupling shaft extending generally parallel to the axis, the spring lever including a mounting aperture proximate a first end, the mounting aperture sized to receive the coupling shaft, the spring lever further including a torque transfer slot radially spaced from the mounting aperture, the peg extending into the torque transfer slot.

9. The valve actuator of claim 8, wherein the spring lever is formed of a resilient flexible material and is mounted to the drive gear such that it must flex between the locked and unlocked conditions.

10. A valve assembly including:

a valve having a valve stem;

a valve actuator operably removably connected to the valve stem and configured to drive the valve between open and closed conditions, the valve actuator including:

a support structure;

a drive gear supported by the support structure, the drive gear operably coupled to the valve stem;

a motor operably coupled to the drive gear;

a mechanical latch arrangement for manually setting the orientation of the drive gear relative to the support structure, the latch arrangement including a spring lever operably coupled to the drive gear for coordinated rotation of the drive gear and spring lever, the spring lever extending out of the support structure through a slot of the support structure, the slot of the support structure including a recessed portion including an abutment wall, the latch arrangement having a locked condition in which the spring lever is positioned within the recess and is biased against the abutment wall by biasing provided by the return spring in the first direction the latch arrangement having an unlocked condition in which the spring lever is positioned above the recess and the abutment wall such that the abutment wall will not interfere with movement of the spring lever during movement of the spring lever in the first direction;

wherein the mechanical latch arrangement remains with the valve actuator when the valve actuator is removed from the valve;

wherein the spring lever is resiliently bent into the first recess in a second direction extending generally parallel to the axis of rotation in the locked condition;

wherein the first recess includes a bottom wall extending perpendicularly to the abutment wall and wherein the support structure includes a catch extending beyond the first abutment wall in a third direction, opposite the first direction, the catch and bottom wall forming a gap therebetween, the spring lever inserted into the gap and between the catch and bottom wall in the locked position, the catch securing the spring lever within the first recess until the spring lever is moved away from the first abutment wall in the third direction.

11. The valve actuator of claim 10, wherein the spring lever is a separate component independent of the drive gear.

12. A valve assembly including:

a valve having a valve stem;

a valve actuator operably removably connected to the valve stem and configured to drive the valve between open and closed conditions, the valve actuator including:

a support structure;

a drive gear supported by the support structure, the drive gear operably coupled to the valve stem;

a motor operably coupled to the drive gear;

a mechanical latch arrangement for manually setting the orientation of the drive gear relative to the support structure, the latch arrangement including a spring lever the spring lever extending out of the support structure through a slot of the support structure, the slot of the support structure including a recessed portion including an abutment wall, the latch arrangement having a locked condition in which the spring lever is positioned within the recess and is biased against the abutment wall by biasing provided by the return spring in the first direction, the latch arrangement having an unlocked condition in which the spring lever is positioned above the recess and the abutment wall such that the abutment wall will not interfere with movement of the spring lever during movement of the spring lever in the first direction;

wherein the mechanical latch arrangement remains with the valve actuator when the valve actuator is removed from the valve; and wherein the latch arrangement includes a second recess formed in the slot of the support structure, the second recess being spaced apart from the first recess in the first direction, the second recess including a second abutment wall, the return spring being reconfigurable relative to the drive gear and to bias the drive gear in a third direction about the axis of rotation, opposite the first direction, in this configuration, the latch arrangement has a locked condition in which the spring lever is positioned within the second recess and is biased against the second abutment wall by biasing provided by the return spring in the third direction, the latch arrangement having an unlocked condition in which the spring lever is positioned above the second recess and the second abutment wall such that the second abutment wall will not interfere with movement of the spring lever during movement of the spring lever in the third direction.

13. The valve actuator of claim 12, wherein in the locked position, friction between the first abutment wall and spring lever is greater than a spring force biasing the spring lever out of the first recess due to the resilient bending of the spring lever.

14. The valve actuator of claim 12, wherein the spring lever is a manual positioning lever integrally formed as a part of the drive gear, the manual positioning lever extends through the slot and exterior of the support structure.

15. The valve actuator of claim 12, wherein the motor drives the drive gear in the third direction away from the first abutment wall such that the spring lever automatically transition from the locked condition being within the first recess to the unlocked condition being out of the first recess without assistance from an external biasing member.

16. A valve assembly including:
a valve having a valve stem;
a valve actuator operably removably connected to the valve stem and configured to drive the valve between open and closed conditions, the valve actuator including:
a support structure;
a drive gear supported by the support structure, the drive gear operably coupled to the valve stem;
a motor operably coupled to the drive gear;
a mechanical latch arrangement for manually setting the orientation of the drive gear relative to the support structure, the latch arrangement including a spring lever operably coupled to the drive gear for coordinated rotation of the drive gear and spring lever, the spring lever extending out of the support structure through a slot of the support structure, the slot of the support structure including a recessed portion including an abutment wall, the latch arrangement having a locked condition in which the spring lever is positioned within the recess and is biased against the abutment wall by biasing provided by the return spring in the first direction, the latch arrangement having an unlocked condition in which the spring lever is positioned above the recess and the abutment wall such that the abutment wall will not interfere with movement of the spring lever during movement of the spring lever in the first direction;
wherein the mechanical latch arrangement remains with the valve actuator when the valve actuator is removed from the valve;
wherein the spring lever is a separate component independent of the drive gear, and
wherein the drive gear includes a manual positioning lever that extends through the slot and exterior of the support structure and is generally angularly aligned with the spring lever.

\* \* \* \* \*

UNITED STATES PATENT AND TRADEMARK OFFICE
CERTIFICATE OF CORRECTION

| | | |
|---|---|---|
| PATENT NO. | : 7,913,972 B2 | Page 1 of 1 |
| APPLICATION NO. | : 12/025460 | |
| DATED | : March 29, 2011 | |
| INVENTOR(S) | : Gerald R. Parsons | |

It is certified that error appears in the above-identified patent and that said Letters Patent is hereby corrected as shown below:

In column 8, line 58, "coordinate" should be -- coordinated --.

In column 10, line 7, "direction" should be -- direction, --.

In column 10, line 43, after the first instance of the word "lever" -- operably coupled to the drive gear for coordinated rotation of the drive gear and spring lever, -- should be inserted.

Signed and Sealed this
Seventeenth Day of May, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,913,972 B2 | Page 1 of 1 |
| APPLICATION NO. | : 12/025460 | |
| DATED | : March 29, 2011 | |
| INVENTOR(S) | : Gerald R. Parsons | |

It is certified that error appears in the above-identified patent and that said Letters Patent is hereby corrected as shown below:

In column 3, line 5, "FIG." should be -- FIG. 1 --.

In column 3, line 61, "110, 122" should be -- 110, 112 --.

In column 5, line 53, "to ward" should be -- toward --.

In column 7, line 29, "sprig" should be -- spring --.

Signed and Sealed this
Thirty-first Day of May, 2011

David J. Kappos
*Director of the United States Patent and Trademark Office*